US012756446B2

(12) United States Patent
AlAmmouri et al.

(10) Patent No.: US 12,756,446 B2
(45) Date of Patent: Oct. 6, 2026

(54) SCHEDULING AND BEAM DESIGN IN JPTA

(71) Applicant: Samsung Electronics Co., Ltd., Suwon-si (KR)

(72) Inventors: Ahmad AlAmmouri, Richardson, TX (US); Jianhua Mo, Allen, TX (US); Young Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 18/613,049

(22) Filed: Mar. 21, 2024

(65) Prior Publication Data

US 2024/0372598 A1 Nov. 7, 2024

Related U.S. Application Data

(60) Provisional application No. 63/463,213, filed on May 1, 2023.

(51) Int. Cl.

| | |
|---|---|
| ***H04L 5/12*** | (2006.01) |
| ***H04B 7/06*** | (2006.01) |
| ***H04W 72/044*** | (2023.01) |

(52) U.S. Cl.
CPC ......... *H04B 7/0695* (2013.01); *H04B 7/0639* (2013.01); *H04W 72/046* (2013.01)

(58) Field of Classification Search
CPC .. H04B 7/0695; H04B 7/0639; H04W 72/046
USPC ................ 375/262, 260, 259, 219, 295, 316
See application file for complete search history.

(56) References Cited

U.S. PATENT DOCUMENTS

| | | | |
|---|---|---|---|
| 11,129,161 | B2 | 9/2021 | Guo |
| 11,223,985 | B2 | 1/2022 | Park et al. |
| 11,317,415 | B2 | 4/2022 | Khoryaev et al. |
| 11,664,853 | B2 | 5/2023 | Park et al. |
| 2015/0365939 | A1 | 12/2015 | Zhang et al. |
| 2017/0346611 | A1 | 11/2017 | Stirling-Gallacher et al. |

(Continued)

FOREIGN PATENT DOCUMENTS

| | | | |
|---|---|---|---|
| EP | 3433945 | B1 | 10/2019 |
| WO | 2023140571 | A1 | 7/2023 |

OTHER PUBLICATIONS

International Search Report and Written Opinion issued Aug. 2, 2024 regarding International Application No. PCT/KR2024/005831, 6 pages.

(Continued)

*Primary Examiner* — Zewdu A Kassa

(57) ABSTRACT

Method and apparatuses for scheduling and beam design in joint phase time arrays (JPTAs). In another embodiment, a method for operating a base station (BS) is provided. The method includes identifying a set of user equipments (UEs) to schedule, a plurality of resource blocks (RBs), and a UE beam map. The UE beam map maps one or more beams from a plurality of beams to one or more UEs in the set of UEs. The method further includes allocating, for a UE in the set of UEs, one or more RBs from the plurality of RBs based the UE beam map and a beam gain on the one or more RBs in a direction of the UE. The method further includes determining a JPTA beam for the UE. The method further includes transmitting scheduling information indicating the allocated one or more RBs and the determined one or more JPTA beams.

18 Claims, 12 Drawing Sheets

(56) References Cited

U.S. PATENT DOCUMENTS

| | | | | |
|---|---|---|---|---|
| 2019/0387441 | A1 | 12/2019 | Koskela et al. | |
| 2020/0252117 | A1 | 8/2020 | Cheng et al. | |
| 2021/0288704 | A1 | 9/2021 | Shim et al. | |
| 2023/0118482 | A1 | 4/2023 | Chakraborty et al. | |
| 2023/0136372 | A1 | 5/2023 | Ratnam et al. | |
| 2023/0216567 | A1 | 7/2023 | Yuan et al. | |
| 2023/0335896 | A1* | 10/2023 | Jeon | H01Q 3/2694 |
| 2023/0361823 | A1 | 11/2023 | Mo et al. | |
| 2023/0362671 | A1 | 11/2023 | Mo et al. | |
| 2024/0121767 | A1* | 4/2024 | Logothetis | H04W 72/541 |

OTHER PUBLICATIONS

Ratnam et al., "Joint Phase-Time Arrays: A Paradigm for Frequency-Dependent Analog Beamforming in 6G", IEEE Access, vol. 10, Jul. 2022, pp. 73364-73377.

Boljanovic et al., "Fast Beam Training with True-Time-Delay Arrays in Wideband Millimeter-Wave Systems", IEEE Transactions on Circuits and Systems I: Regular Papers, vol. 68, No. 4, Apr. 2021, pp. 1727-1739.

Jain et al., "Towards Flexible Frequency-Dependent mmWave Multi-Beamforming", International Workshop on Mobile Computing Systems and Applications (HotMobile '23), Feb. 2023, 2 pages.

AlAmmouri et al., "Extending Uplink Coverage of mmWave and Terahertz Systems Through Joint Phase-Time Arrays", IEEE Access, vol. 10, Aug. 2022, pp. 88872-88884.

Supplementary European Search Report dated Jan. 2, 2026, in connection with European Application No. 24800215.6, 11 pages.

* cited by examiner

SCHEDULING AND BEAM DESIGN IN JPTA

CROSS-REFERENCE TO RELATED AND CLAIM OF PRIORITY

The present application claims priority under 35 U.S.C. § 119 (e) to U.S. Provisional Patent Application No. 63/463,213 filed on May 1, 2023, which is hereby incorporated by reference in its entirety.

TECHNICAL FIELD

The present disclosure relates generally to wireless communication systems and, more specifically, the present disclosure relates to scheduling and beam design in joint phase-time arrays (JPTAs).

BACKGROUND

As wireless communication has grown and the number of subscribers to wireless communication services continues to grow quickly, the demand for wireless data traffic is rapidly increasing due to the growing popularity among consumers and businesses. To meet the high growth in mobile data traffic and support new applications and deployments, improvements in radio interface efficiency and coverage are of paramount importance. Moreover, this demand for wireless data traffic has increased since the deployment of 4G communication systems, and to enable various vertical applications, 5G (e.g., fifth generation) communication systems have been developed and are currently being deployed. Several characteristics of such applications have also been considered. A basic philosophy of 5G or New Radio (NR) in the 3rd Generation Partnership Project (3GPP) is to support beam-specific operations for wireless communication between a gNodeB (gNB) and user equipment (UE). Several components in the 5G NR specification can efficiently be operated in a beam-specific manner. Note that the 5G communication system involves implementation to include higher frequency millimeter-wave (mm Wave) bands, such as 28 GHz or 60 GHIz bands or, in general, above 6 GHz bands, to accomplish higher data rates, or in lower frequency bands, such as below 6 GHz, to enable robust coverage and mobility support.

SUMMARY

The present disclosure relates to scheduling and beam design in JPTAs.

In one embodiment, a base station (BS) is provided. The BS includes a processor configured to identify a set of user equipments (UEs) to schedule, a plurality of resource blocks (RBs), and a UE beam map. The UE beam map maps one or more beams from a plurality of beams to one or more UEs in the set of UEs. The processor is further configured to allocate, for a UE in the set of UEs, one or more RBs from the plurality of RBs based the UE beam map and a beam gain on the one or more RBs in a direction of the UE. The processor is further configured to determine a joint phase time array (JPTA) beam for the UE. The BS further includes a transceiver operably coupled to the processor. The transceiver is configured to transmit scheduling information indicating the allocated one or more RBs and the determined one or more JPTA beams.

In another embodiment, a method for operating a BS is provided. The method includes identifying a set of UEs to schedule, a plurality of RBs, and a UE beam map. The UE beam map maps one or more beams from a plurality of beams to one or more UEs in the set of UEs. The method further includes allocating, for a UE in the set of UEs, one or more RBs from the plurality of RBs based the UE beam map and a beam gain on the one or more RBs in a direction of the UE. The method further includes determining a JPTA beam for the UE. The method further includes transmitting scheduling information indicating the allocated one or more RBs and the determined one or more JPTA beams.

In yet another embodiment, a non-transitory computer readable medium includes program code that, when executed by a processor of a BS, causes the BS to identify a set of UEs to schedule, a plurality of RBs, and a UE beam map. The UE beam map maps one or more beams from a plurality of beams to one or more UEs in the set of UEs. The non-transitory computer readable medium further includes program code that, when executed by a processor of a BS, causes the BS to: allocate, for a UE in the set of UEs, one or more RBs from the plurality of RBs based the UE beam map and a beam gain on the one or more RBs in a direction of the UE; determine a JPTA beam for the UE; and transmit scheduling information indicating the allocated one or more RBs and the determined one or more JPTA beams.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
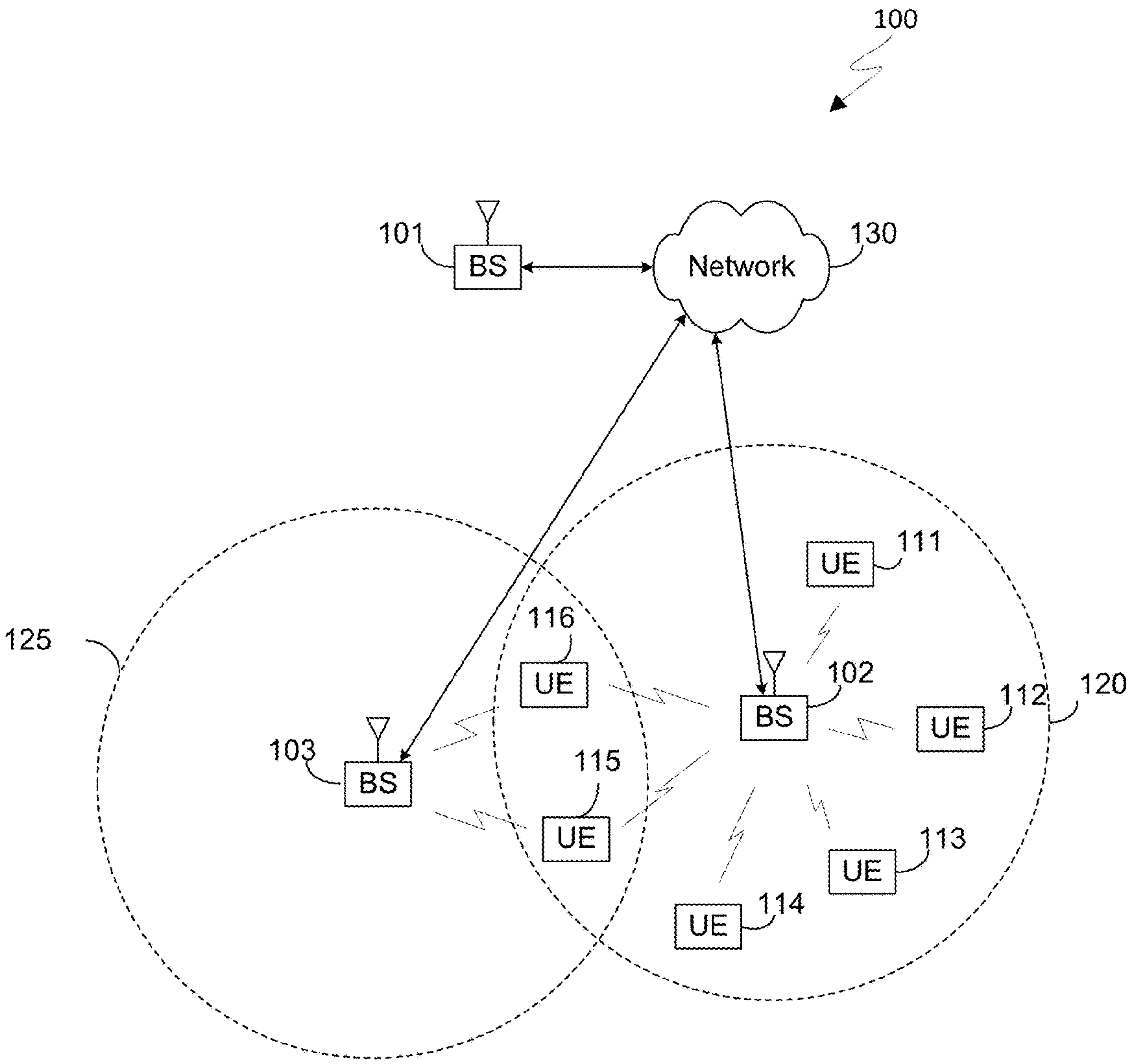
FIG. 1 illustrates an example wireless network according to embodiments of the present disclosure.

FIGS. 1-13, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since the deployment of 4G communication systems, efforts have been made to develop an improved 5G or pre-5G communication system. Therefore, the 5G or pre-5G communication system is also called a "beyond 4G network" or a "post LTE system."

The 5G communication system is implemented in higher frequency (mmWave) bands, e.g., 60 GHz bands, to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is underway based on advanced small cells, cloud radio access networks (RANs), ultra-dense networks, device-to-device (D2D) communication, wireless backhaul communication, moving network, cooperative communication, coordinated multi-points (COMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and non-limiting embodiments of the present disclosure may be utilized in connection with any frequency band. For example, aspects of the present disclosure may also be applied to the deployment of 5G communication systems, 6G or even later releases which may use terahertz (THz) bands.

The following documents are hereby incorporated by reference into the present disclosure as if fully set forth herein: [1] V. Boljanovic et al, "Fast Beam Training with True-Time-Delay Arrays in Wideband Millimeter-Wave Systems," in IEEE Transactions on Circuits and Systems I: Regular Papers, vol. 68, no. 4, pp. 1727-1739, April 2021, doi: 10.1109/TCSI.2021.3054428; [2] I. Jain, et al., "Towards Flexible Frequency-Dependent mmWave Multi-Beamforming" International Workshop on Mobile Computing Systems and Applications (HotMobile '23), 2023, doi: 10.1145/3572864.3581579; [3] A. Alammouri et al., "Extending Uplink Coverage of mmWave and Terahertz Systems Through Joint Phase-Time Arrays," in IEEE Access, vol. 10, pp. 88872-88884, 2022, doi: 10.1109/ACCESS.2022.3200334; and [4] V. V. Ratnam et al., "Joint Phase-Time Arrays: A Paradigm for Frequency-Dependent Analog Beamforming in 6G," in IEEE Access, vol. 10, pp. 73364-73377, 2022, doi: 10.1109/ACCESS.2022.3190418.

Figure 2:
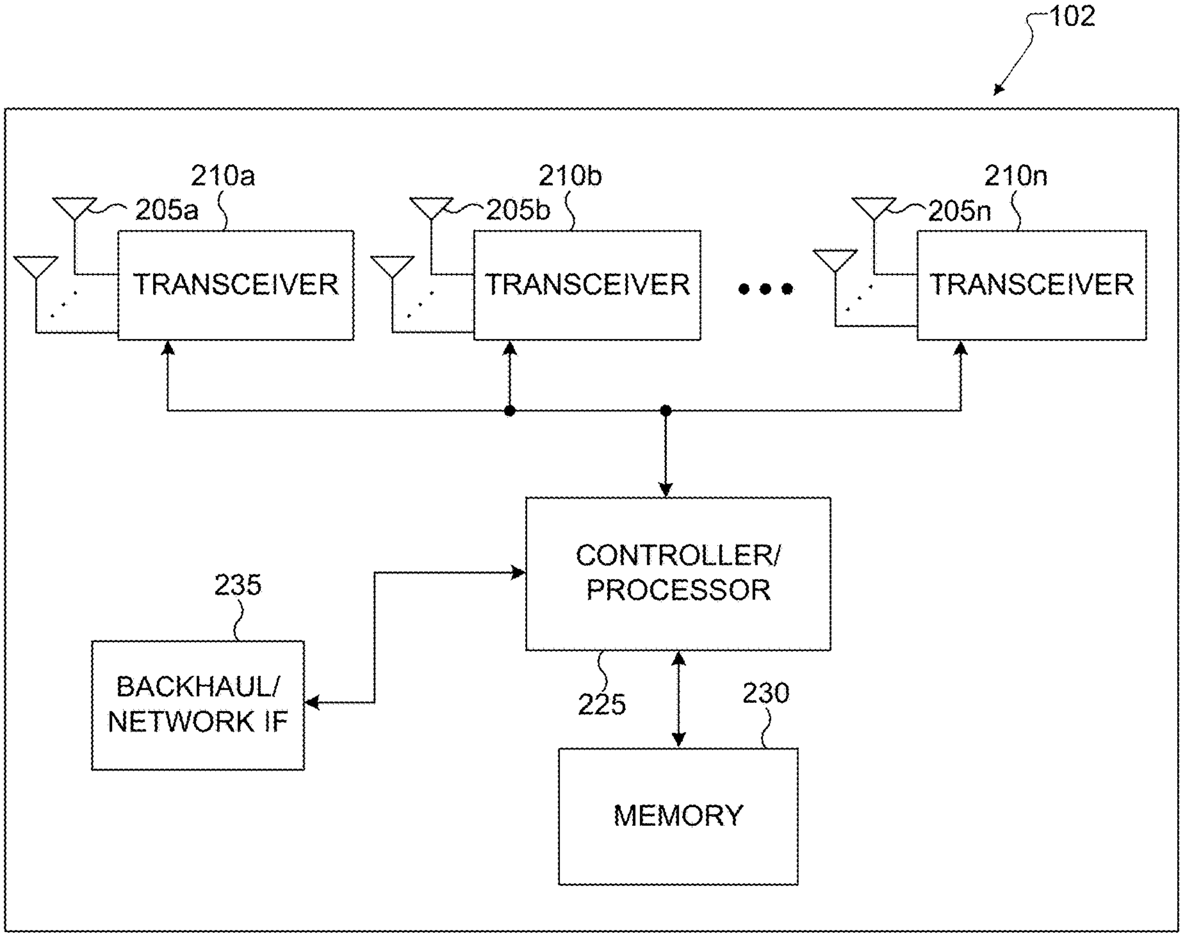
FIG. 2 illustrates an example BS according to embodiments of the present disclosure.
Figure 3:
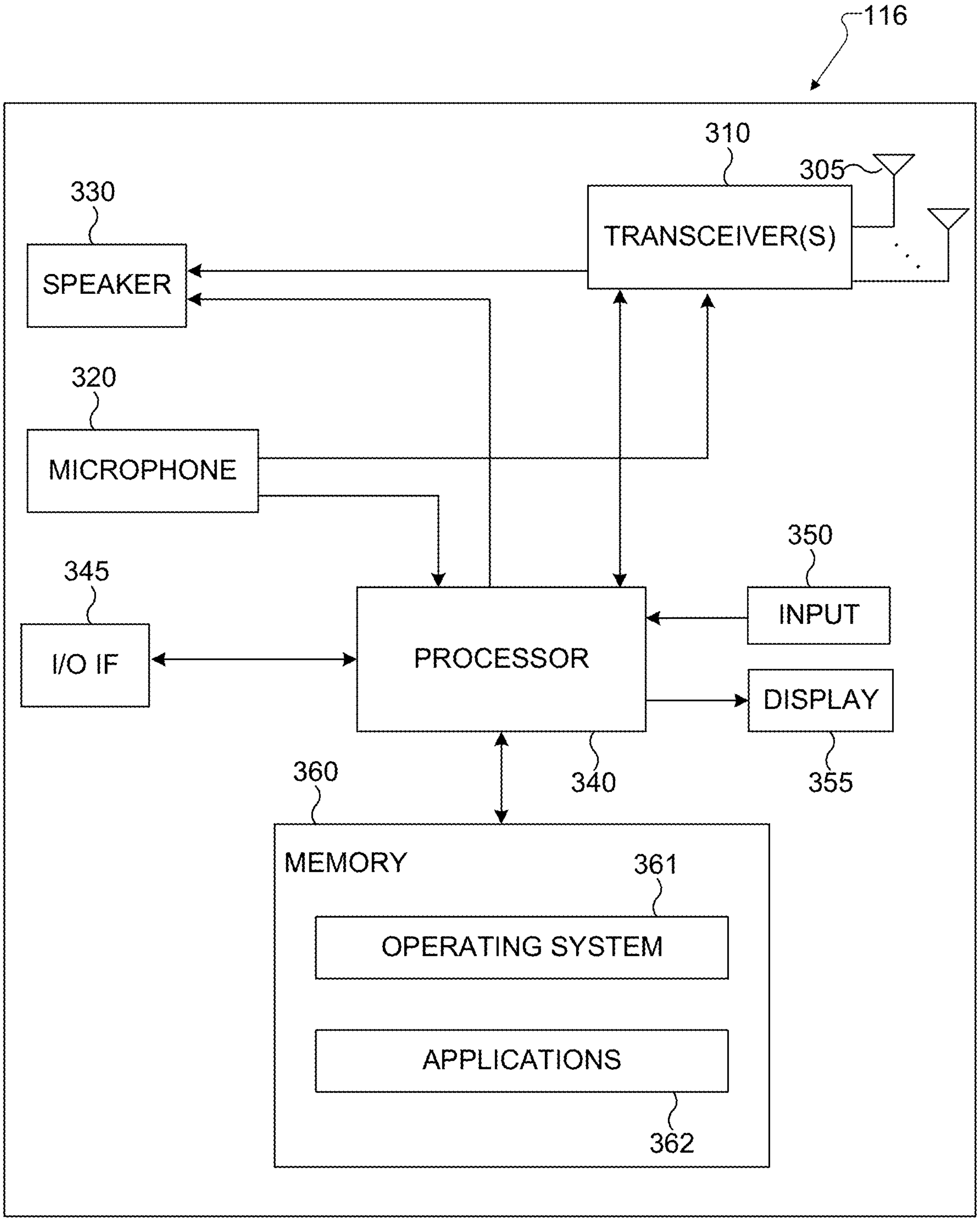
FIG. 3 illustrates an example of a UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or another data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing scheduling and beam design in JPTAs. In certain embodiments, one or more of the gNBs 101-103 include circuitry, programing, or a combination thereof for supporting scheduling and beam design in JPTAs.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for scheduling and beam design in JPTAs as described in greater detail below. Any of a wide variety of other functions could be supported in the gNB 102 by the controller/processor 225.

The controller/processor 225 is also capable of executing programs and other processes resident in the memory 230, such as processes to support scheduling and beam design in JPTAs as described in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for using scheduling and beam design in JPTAs. The processor 340 can move data into or out of the memory 360 as required by an executing process. For example, in various embodiments, the UE 116 uses JPTA beamforming for DL receptions from eNB 102 and/or 103 for mobility robustness.

In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
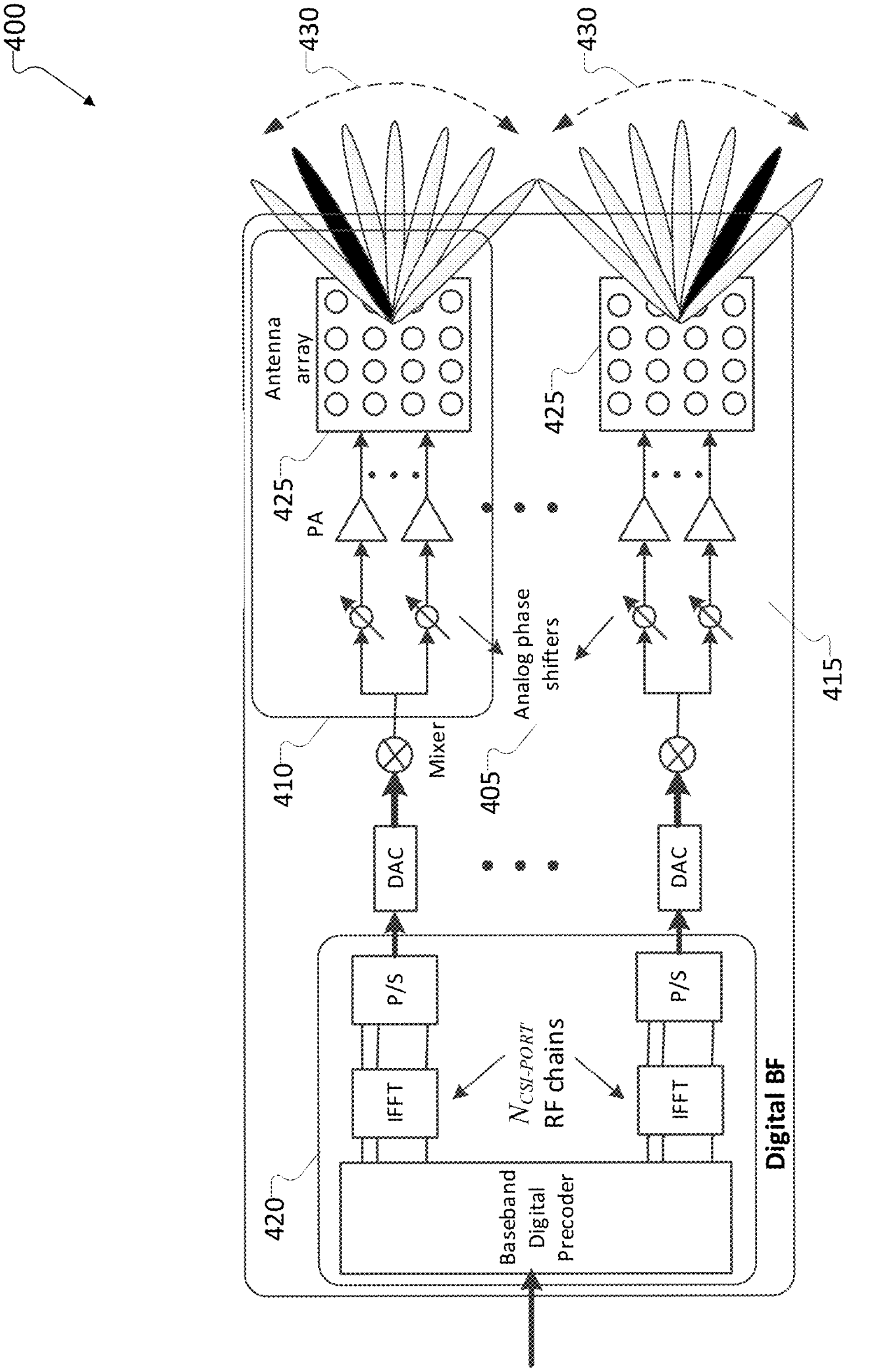
FIG. 4 illustrates an example of a transmitter structure for beamforming according to embodiments of the present disclosure.

FIG. 4 illustrates an example of a transmitter structure 400 for beamforming according to various embodiments of the present disclosure. The non-limiting embodiment of the transmitter structure 400 illustrated in FIG. 4 is for illustration only. FIG. 4 does not limit the scope of this disclosure to any particular implementation of the transmitter structure 400. In certain embodiments, one or more of gNB 102 or UE 116 include the transmitter structure 400. For example, one or more of antenna 205 and its associated systems or antenna 305 and its associated systems can be included in transmitter structure 400.

In the example shown in FIG. 4, the transmitter structure 400 includes analog phase shifters 405, an analog beamformer (BF) 410, a hybrid BF 415, a digital BF 420, and one or more antenna arrays 425. In this case, one antenna port is mapped onto many antenna elements in antenna arrays 425, which can be controlled by the bank of analog phase shifters 405. One antenna port can then correspond to one sub-array which produces a narrow analog beam through analog beamforming by analogy BF 410. The analog beam can be configured to sweep 430 across a wider range of angles by varying the phase shifter bank 405 across symbols or subframes.

Analog beamforming relies on analog hardware such as phase-shifters and switches to create the beam shapes. However, these analog hardware components create a frequency-flat response. All components of the input signal frequency undergo a similar transformation after passing through them. This reduces the flexibility of the beamforming.

Embodiments of the present disclosure recognize that, due to the rising demand for traffic, wireless systems are moving towards higher frequency of operation, such as millimeter-wave (mm-wave) and terahertz (THz) frequencies, where abundant spectrum is available. However, the higher frequencies also suffer from a high channel propagation loss, and therefore require a large antenna array to create sufficient beamforming gain to ensure sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as analog-to-digital converters (ADCs) and/or digital-to-analog converters (DACs) also grows tremendously. Thus, fully digital transceiver implementations, where each antenna element is fed by a dedicated radio-frequency (RF) chain, may not be practical. To keep the hardware cost and power consumption of such large antenna arrays manageable, typically an analog beamforming or hybrid beamforming architecture is adopted where the large antenna array is fed with a much smaller number of RF chains via the use of analog hardware such as phase-shifters. This reduces the number of mixed-signal components which significantly reduces the cost, size, and power consumption of the transceivers. When transmitting a signal at the transmitter, a combination of digital beamforming before DAC and analog beamforming using the phase-shifters is used to create the overall beam shape in the desired direction. Similarly, when receiving a signal at the receiver, a combination of analog beamforming using phase-shifters and digital beamforming after ADC is used to create the overall beam shape in the desired direction.

Accordingly, various embodiments of the present disclosure utilize frequency-dependent hybrid beamforming, which is referred to as JPTA beamforming. Note that, here, frequency-dependent beamforming refers to a technique where different components of the input signal may encounter a differently shaped analog beam based on their frequency.

Figure 5:
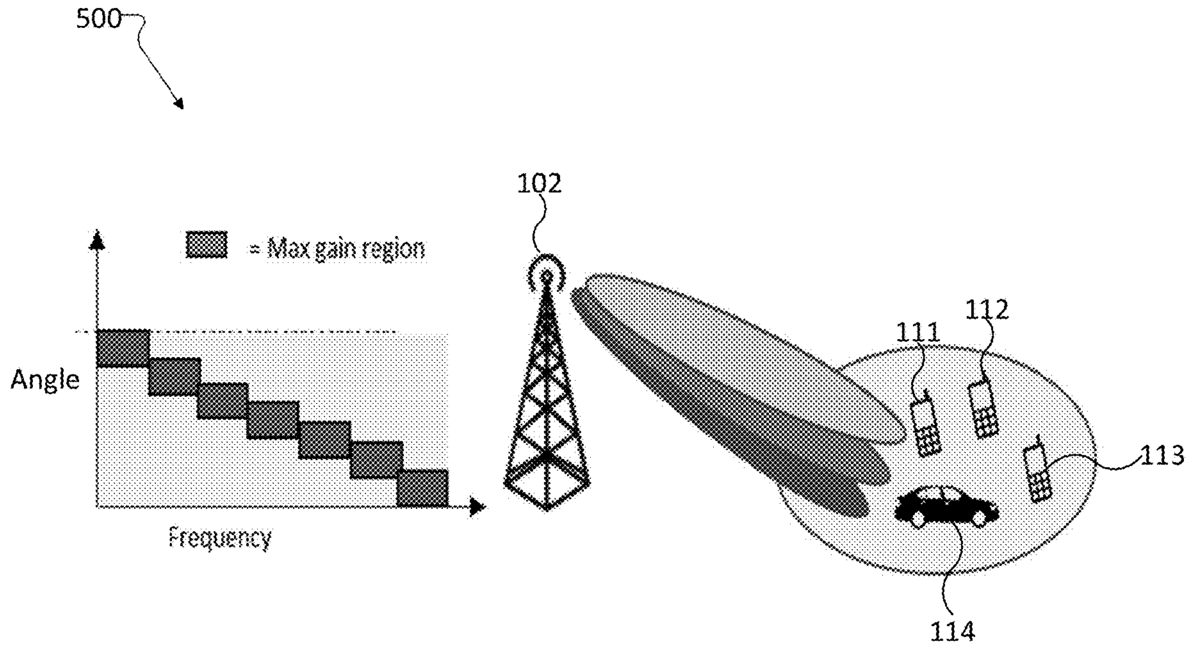
FIG. 5 illustrates an example of a JPTA beamforming according to embodiments of the present disclosure.

FIG. 5 illustrates an example of a JPTA beamforming 500 according to various embodiments of the present disclosure. For example, the JPTA beamforming 500 provides an example of the frequency varying linearly over the system bandwidth and the angular direction sweeping linearly over a certain region according to embodiments of the present disclosure. For example, the JPTA beamforming 500 may be performed in network 130 by BS 102. The JPTA beamforming 500 is for illustration only and other embodiments can be used without departing from the scope of the present disclosure.

In one example behavior of JPTA operation, the maximum gain region of the beam sweeps over an angle range as the signal frequency varies. At any signal frequency $f$, the desired beam creates the maximum possible array-gain in one angular direction $\theta(f)$. As $f$ varies linearly over the system bandwidth, the angular direction $\theta(f)$ also sweeps linearly over a certain angular region $[\theta_0-\Delta\theta/2, \theta_0+\Delta\theta/2]$, as shown in FIG. 5. Embodiments in this disclosure can be applied to other behaviors of JPTA operation as well.

Figure 6:
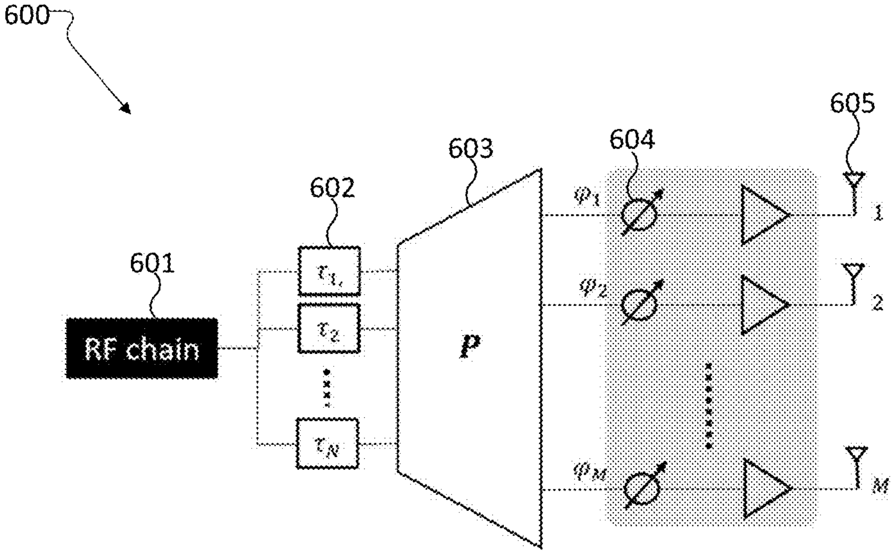
FIG. 6 illustrates an example of a BS JPTA architecture with one radio frequency (RF) chain and single phase-shifter per antenna element according to embodiments of the present disclosure.

FIG. 6 illustrates an example of a BS JPTA architecture 600 with one RF chain and single phase-shifter per antenna element according to various embodiments of the present disclosure. For example, the BS JPTA architecture 600 may be implemented in BS 102 and, more particularly, in one or more of the transceivers 210. The BS JPTA architecture 600 is for illustration only and other embodiments can be used without departing from the scope of the present disclosure.

In one embodiment, the BS 102 is assumed to have a uniform linear antenna array having M elements, and $N_{RF}=1$ RF chain. Note that the disclosure can be directly extended to planar array configurations. The antenna spacing is half-wavelength at the center frequency $f\sigma$. Each of the M antennas has a dedicated phase-shifter, and they are connected to the single RF chain via a network of N≤M TTDs as shown in FIG. 6. Here P is a fixed M×N mapping matrix, where each row m has one non-zero entry and determines which of the N TTDs antenna m is connected to. The TTDs are assumed to be configurable, with a delay variation range of $0\leq\tau\leq\kappa W$, where $\kappa$ is a design parameter to be selected. The phase-shifters are assumed to have unit magnitude and have arbitrarily reconfigurable phase $-\pi\leq\phi<\pi$. Transmission in both uplink and downlink directions is performed using OFDM with K subcarriers indexed as $$\mathcal{K} = \left\{\left\lfloor\frac{1-K}{2}\right\rfloor, \ldots, \left\lfloor\frac{K-1}{2}\right\rfloor\right\}.$$

Then, the M×1 downlink TX signal on sub-carrier $k\in\mathcal{K}$ for a representative OFDM symbol can be expressed as:

$$x_k = \frac{1}{\sqrt{M}}\begin{bmatrix} e^{j\varphi_1} & \ldots & 0 \\ \vdots & \ddots & \vdots \\ 0 & \ldots & e^{j\varphi_M}\end{bmatrix} P \begin{bmatrix} e^{j2\pi f_k\tau_1} \\ \vdots \\ e^{j2\pi f_k\tau_N}\end{bmatrix} \alpha_k s_k = TPd_k\alpha_k s_k$$

where $s_k$ and $\alpha_k$ are the scalar data and digital beamforming on the k-th subcarrier, $f_k$ is the frequency of the k-th sub-carrier (including the carrier frequency), In is the delay of the n-th TTD and ϕm is the phase of the m phase-shifter connected to the m-th antenna. Note that from the equation above the total transmit power of the BS 102 can be given by $P_{sum}=\Sigma_{k\in k}|\alpha_k|^2$. Note that for this JPTA architecture, the effective downlink unit-norm analog beamformer on sub-carrier k is $e_k=TPd_k$, where the M×M diagonal matrix T captures the effect of phase-shifters and the N×1 vector dk captures the effect of TTDs. It can be shown that the same beamformer is also applicable at the BS 102 for an uplink scenario.

Embodiments of the present disclosure recognize that, despite the recent works on the JPTA beam design and performance analysis, the integration of JPTA with the current workflow in the MAC and PHY layers in the base implementations may not be clear.

In FR1, the scheduler has access to the set of backlogged (active) UEs along with contextual information for each UE. The information could include: the size of backlogged data, the channel condition, data priority, last time the UE 116 was served, etc. This information will be used by the scheduler to select of subset of the UEs and assign a distinct set of resource blocks (RBs) for sub-bands for each UE. The output of the scheduler is passed to the PHY layer in an array or a structure of a UE index, allocated RBs for the UE 116, and/or additional configurations. The additional configurations include the modulation and coding scheme (MCS) index, the # of streams, hybrid automatic repeat request (HARQ) configurations, etc.

Based on the UE 116/RB allocation and the additional configurations, the PHY layer is configured to receive data from the UEs in case of uplink or transmit data in the case of the downlink. The UE 116 is also informed of these choices through different control signaling.

In FR2 systems, the gNB 102 has a UE-Beam map, which indicates the beam associated with each UE. The associated beam could be corresponding to a synchronization signal/physical broadcast channels (SSB) or a channel state information reference signal (CSI-RS) resource, or both, depending on the gNB 102 implementation.

Figure 8:
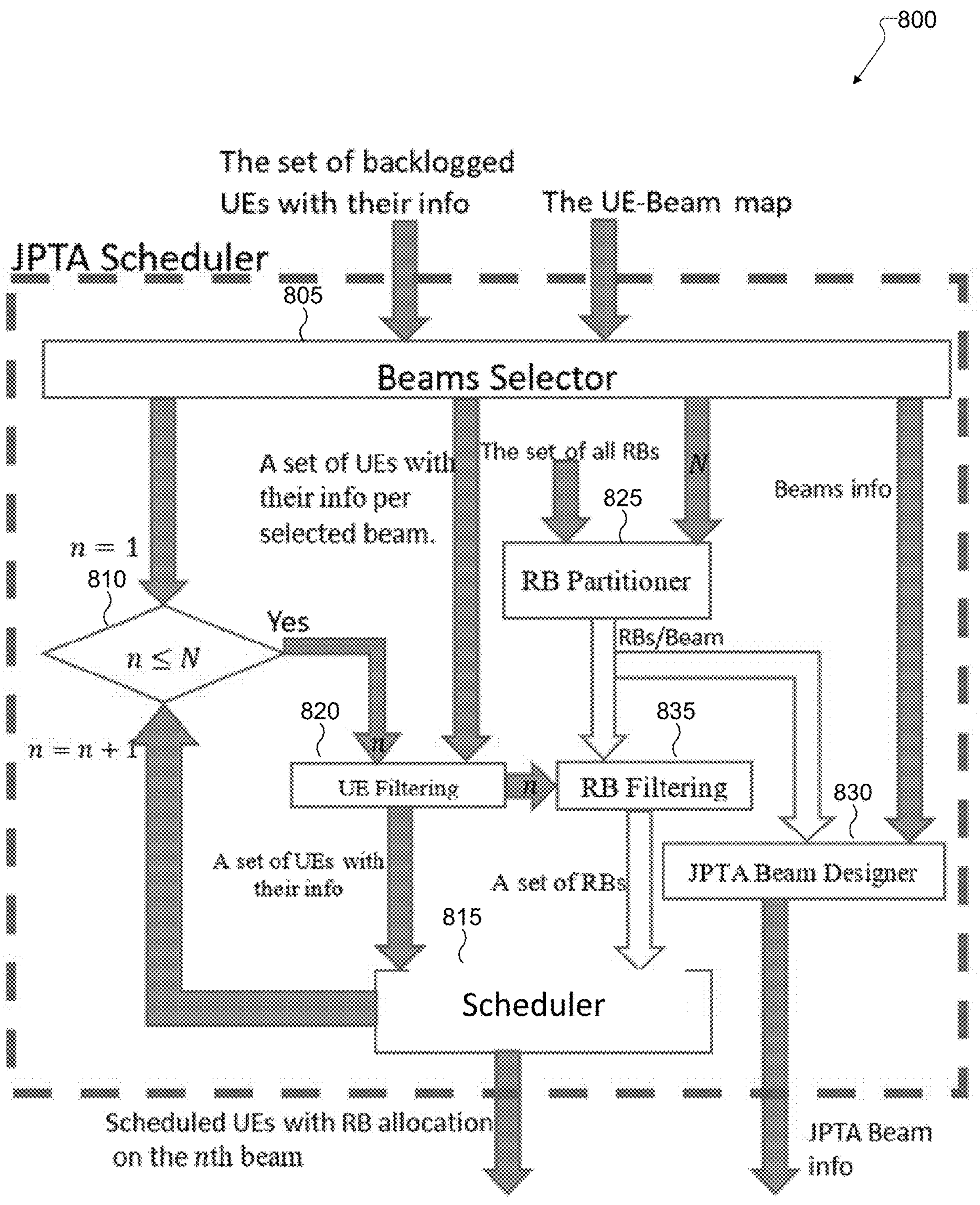
FIG. 8 illustrates a flow diagram of a JPTA scheduler according to embodiments of the present disclosure.

In a single TRX setup, at any time slot, the gNB 102 could only schedule UEs served by the same beam and this needs to be evaluated in the FR2 scheduler. The information of the chosen beam has to be passed to the PHY layer to configure the phased array antenna (PAA) RF network, i.e., the phases of the phase shifters. The beam information could be the beam index, the pointing direction, the exact phases of the phase shifters, etc. The mapping between the beam information to the exact beam parameters (phases) could be done in the high PHY as shown in FIG. 8, or in the MAC layer depending on gNB implementation. Overall, the beam information has to have a direct mapping to unique beam parameters.

Compared to FR1, the FR2 scheduler has an additional job in this case: selecting one of the possible beams in UE-Beam map as a serving beam. This implementation reuses the same scheduler mentioned herein, and to this end, a separate block beam(s) selector block 805 is used to select the serving beam first. The beam(s) selector block 805 could cycle through all the possible beams in a round robin fashion or it could pick the serving beam more carefully by taking into account the load per beam and the UEs info on each beam. Regardless of the criterion used by the beam(s) selector block 805, it picks the UEs served by the chosen beam along with their info and pass them to the Scheduler bock 815, which chooses the UEs that will be served simultaneously as well as the RB allocation per UE. The beam(s) selector block 805 also passes the beam info to the PHY to configure the PAA RF network.

In another option for the FR2 scheduler, the Scheduler block 815 is replaced by a more advanced scheduler that jointly picks the serving beam, the scheduled UEs, and the RB allocation at the same time, which can provide more flexibility and more optimized choices at the expense of higher complexity.

Similar to FR2 with a single TRX, the gNB 102 maintains a map (table) between each UE and its serving beam. The "FR2 Scheduler" can pick up to N beams and serve UEs on these beams simultaneously, where N≤# of TRXs. The desired number of beams could be dynamically determined by the scheduler, preconfigured, or passed from upper layers.

Having multiple serving beams provides the scheduler with the flexibility of assigning the same RB or sub-band to different UEs served by different beams, i.e., the RB allocation per beam can be independent, and hence, the scheduler can reuse the same RB across different beams, which may increase the spectral efficiency (SE). To this end, the "FR2 Scheduler" has to indicate the serving beam for each scheduled UE to the PHY layer, in addition to its RB allocation.

In an option for the implementation of the "FR2 Scheduler", this implementation focuses on reusing the Scheduler block 815, similar to the for the single TRX case. The beam(s) selector block 805 in this case picks up to N beams out the pool of beams in the "UE-Beam" map. It can cycle through the beams in a round-robin fashion, or select the beams based on certain criteria related to the beams and UE info. It could also follow a dedicated sequence of N-tuples indicating the set of beams that could be used together. The sequence could be hardcoded or computed online.

After the beams are selected, the set of all UEs served on each of the selected beams is passed to the UE filtering block 820 along with the beams' info for the selected beams. The UE filtering block 820 selects all UEs served on the first beam and passes them to the Scheduler block 815, which chooses the scheduled UEs on this beam with the RB allocation. The UE filtering block 820 then selects all UEs served on the second beam and passes them to the scheduler block 815. Then, the next beam until UEs on all of the selected beams are scheduled. After this process, the scheduled UEs along with their serving beam and RB allocation is passed to the PHY layer. Also, the beam info for each beam is passed to the PHY layer to configure the PAA RF network. Note that in this implementation, the UEs are scheduled on each beam independently, which simplifies the scheduler and allows reusing the scheduler block 815 from FR1.

In another option for the FR2 scheduler, the scheduler block 815 and the UE filtering block 820 are replaced by a more advanced scheduler, that jointly picks the serving beams, the scheduled UEs, and the RB allocation at the same time, which can provide more flexibility and more optimized choices.

Embodiments of the present disclosure provide different ways to extend the FR2 and FR1 to be compatible with JPTA beamforming. Different implementations are provided that ranges in terms of complexity of flexibility. In various embodiments, the FR2 scheduler is rescheduled to accommodate JPTA beamforming by adding three additional blocks.

In one embodiment, a JPTA scheduler inputs the set of backlogged UEs with their info, the UE-Beam map, and outputs the scheduled UE with RB allocation and the JPTA beam info.

In one embodiment, the JPTA scheduler could take the "FR2 Scheduler" and the "Scheduler" as building blocks.

In another embodiment, the RB Partitioner block 825 and JPTA Beam Designer block 830 are combined into a new block "JPTA Beam Designer/RB Partitioner".

In yet another embodiment, the UEs are scheduled first and then a JPTA beam could be designed that is specifically tailored for this set of UEs.

In various embodiments, a JPTA Scheduler is configured to input a set of one or more backlogged UEs with their information and a UE-Beam map and configured to output at least one scheduled UE with RB allocation and JPTA beam info as a set of phases and delays to be used to configure the RF, or as a beam index that is mapped to the/a set of phases and delays to be used to configure the RF.

In various embodiments, the JPTA Scheduler could reuse the scheduler for FR1 and FR2 as building blocks and add RB Partitioner block 825 and JPTA Beam Designer block 830. The JPTA Scheduler could combine the scheduling, RB partitioning, and beam design into a single block.

Figure 7:
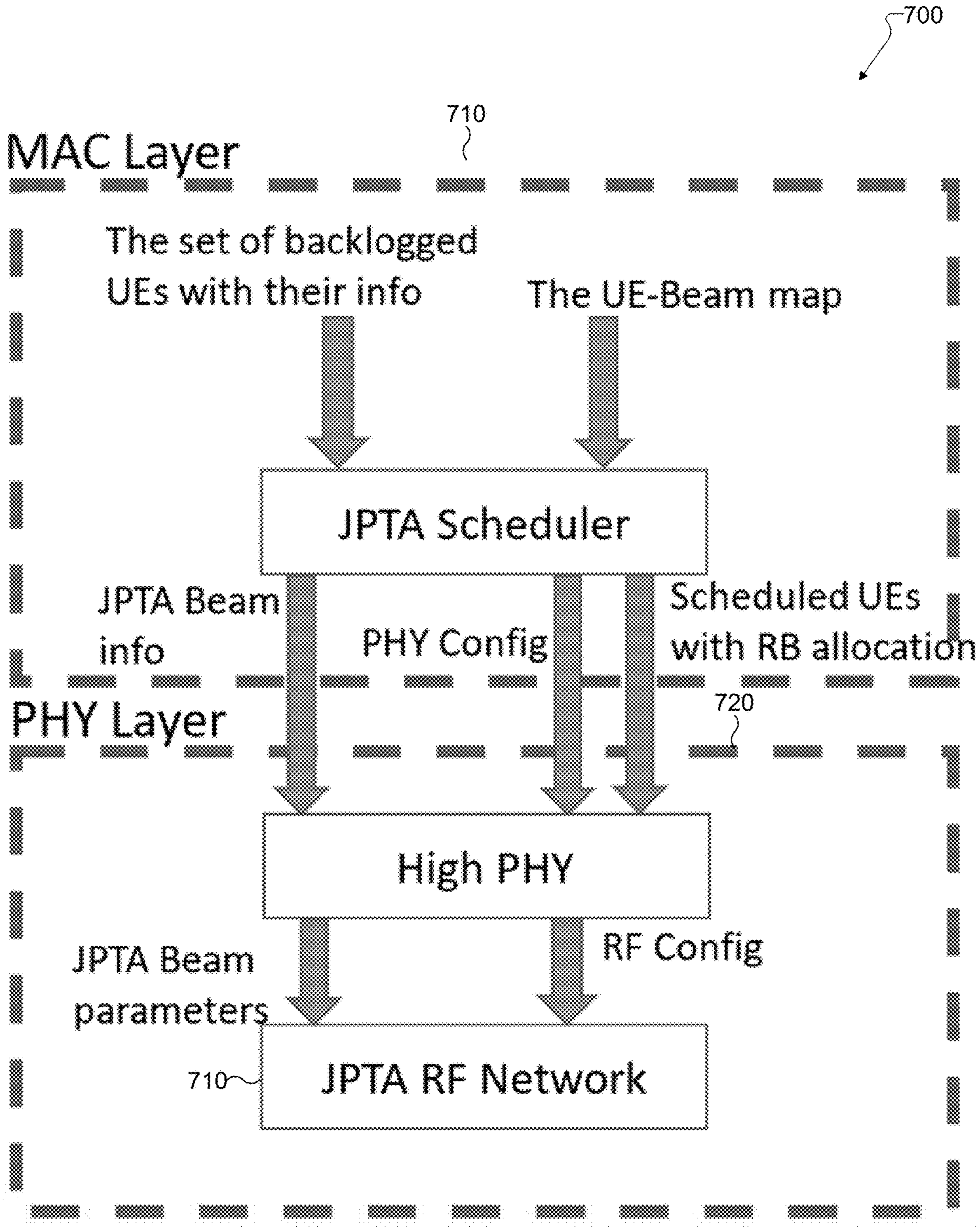
FIG. 7 illustrates a flow diagram of a JPTA scheduler interfacing between the medium access control (MAC) and physical (PHY) layers according to embodiments of the present disclosure.

FIG. 7 illustrates a flow diagram 700 of a JPTA scheduler interfacing between the MAC and PHY block layers 710 and 720, respectively, according to embodiments of the present disclosure. For example, flow diagram 700 of a JPTA scheduler interfacing between the MAC and PHY layers can be implemented by the BS 102 of FIG. 2. This example is for illustration only and other embodiments can be used without departing from the scope of the present disclosure.

MAC layer block 710 provides flow control and multiplexing for transmissions. PHY block layers 720 supports DL/UL communication.

In one embodiment, a JPTA scheduler inputs the set of backlogged UEs with their info, the UE-Beam map, and outputs the scheduled UE with RB allocation, and the JPTA beam info.

The "JPTA Scheduler" is given in FIG. 7. Note that the inputs are the same as in the FR2 case which includes the set of backlogged UEs and their info as well as the UE-Beam map. The UE-Beam map could be the same as in the FR2 case, where each UE is coupled with its best serving beam (SSB or CSI-RS), meaning that the PAA beamforming is used in the initial access phase. However, as discussed in greater detail below, the UE-Beam could also include the pointing angle of each beam and/or the estimated Azimuth angle of Arrival (AoA)/Azimuth angle of Departure (AoD) for each UE.

In some embodiments, the "JPTA scheduler" performs two tasks:

1. Provide the JPTA beam info to the PHY layer block 720. The JPTA beam info could be a beam index that is mapped in the high PHY to the exact delays and phases needed to configure the JPTA RF network, or the exact values for the phases and delays.
2. Schedule UEs with proper RB allocation, such that each UE maintains a high beam gain over its allocated RBs.

In some instances, there are two major differences between the "JPTA Scheduler" and the "FR2 Scheduler":

1. In JPTA, UEs have to be assigned distinct sets of RBs, where in FR2-multi TRX, only UEs served by the same beam should have distinct assigned sets of RBs.
2. In JPTA, a UE could only receive high beam gain on a certain set of RBs depending on its location. This fact correlates the JPTA beam design and the RB allocation. In FR2, the beamforming is frequency-independent, and hence, choosing the beam could be done independently from the RB assignment.

Based on the previous two points, different options for the "JPTA Scheduler" could be implemented.

FIG. 8 illustrates a flow diagram of a JPTA scheduler 800 according to embodiments of the present disclosure. For example, flow diagram of a JPTA scheduler 800 can be implemented by either BS 102 or BS 103 of FIG. 1. This example is for illustration only and other embodiments can be used without departing from the scope of the present disclosure.

In some embodiments, one of the advantages is the scheduler block 815 may be the scheduler used in FR1 and FR2 systems. Some embodiments are able to leverage scheduler 815 for greater compatibility with existing systems.

In one embodiment, the JPTA Scheduler 800 could take the "FR2 Scheduler" and the Scheduler block 815 as building blocks and add the new blocks of RB Partitioner block 825 and JPTA Beam Designer block 830. The detailed procedure is shown in FIG. 8.

As FIG. 8 shows, the first step is to use the beam(s) selector block 805 to select a set of N beams 810 out of the pool in the "UE-Beam" map. This is the same process as in one or more examples described herein, except that N in this case is not determined by the number of TRXs, but a configuration parameter that needs to be specified by the designer or computed dynamically depending on the set of backlogged UEs and their info. Other than that, the process is similar, and the output is passed to UE filtering block 820 which feeds all the UEs served by a single beam to the Scheduler block 815, one beam at a time. However, the Scheduler block 815 does take all RBs as an input in each iteration (beam). In "JPTA Scheduler" 800, instead, it is fed the RBs allocated to this beam, such that different beams are assigned different set of RBs.

The RB per beam allocation is performed by the RB Partitioner block 825. In this option, the RB Partitioner block 825 takes the set of all available RBs and the number of beams (N) as inputs and it is tasked with partitioning the set of all RBs into N disjoint sets of RBs. A simple way to achieve this is by equally partitioning the N sets. Then for each beam n, the "RB Filtering" block only feeds the set of RBs assigned for this beam to the Scheduler block 815.

After feeding the Scheduler block 815 the set of UEs at each beam and the distinct set of RBs for each beam, the output is the set of scheduled UEs and their RB allocation for this beam. After repeating this process for the N selected beams, the set of the scheduled UEs across all the beams along with their RB allocation is passed to the PHY layer block 720. Note that one or more examples described herein, the beam indication per UE is needed in this case.

Another major different in this case is the JPTA Beam Designer block 830, which takes the selected beams from the beam(s) selector block 805 and the RB per Beam allocation from the RB Partitioner block 825 as inputs, and outputs the JPTA beam info. The beam info could be the exact phases and the delays needed to configure the phase shifters and delay units, respectively, in the JPTA RF network or a JPTA beam index that could be mapped to these phases and delays in the high PHY through a lookup table. However, since most JPTA beam designing algorithms, as in [2], [4], need the angle of arrivals as inputs (angle of departure in the downlink), a mapping between the beams in the UE-beam map and the angles is provided. Different ways to do this, are disclosed including (i.e., but not limited to):

1. The pointing angles of each beam could be stored in the UE-Beam map, and hence the pointing angles of the selected beams could be used to design the JPTA beam. In this case, all UEs served by the same beam are assumed to be on the exact pointing angles of the beam.
2. Similar to 1, except that the pointing angles are stored in a separate lookup table that is used in the JPTA beam designer block 830 block to fetch the pointing angles of each of the selected beam.
3. The gNB 102 may estimate the angles for each UE and store it in the UE-Beam map as additional information. This requires extra processing but can result in better JPTA beam designs since different UEs served by the same beam could have different angles of arrival (angles of departure in the downlink).

Additional examples of the design algorithm can be found in [2] or [4]. Note that in this implementation of the JPTA scheduler 800, the JPTA beam designer block 830 is done in parallel to the UE Scheduling, which simplifies the scheduler. However, this also limits the flexibility of the "JPTA Scheduler" 800 since the JPTA beam is designed without knowing which UEs are scheduled and what are their needs in terms of number of RBs. In what follows, other possible implementations of the JPTA Scheduler 800 are provided that gradually increase the complexity of the scheduler and provide with more flexibility at the same time.

Figure 9:
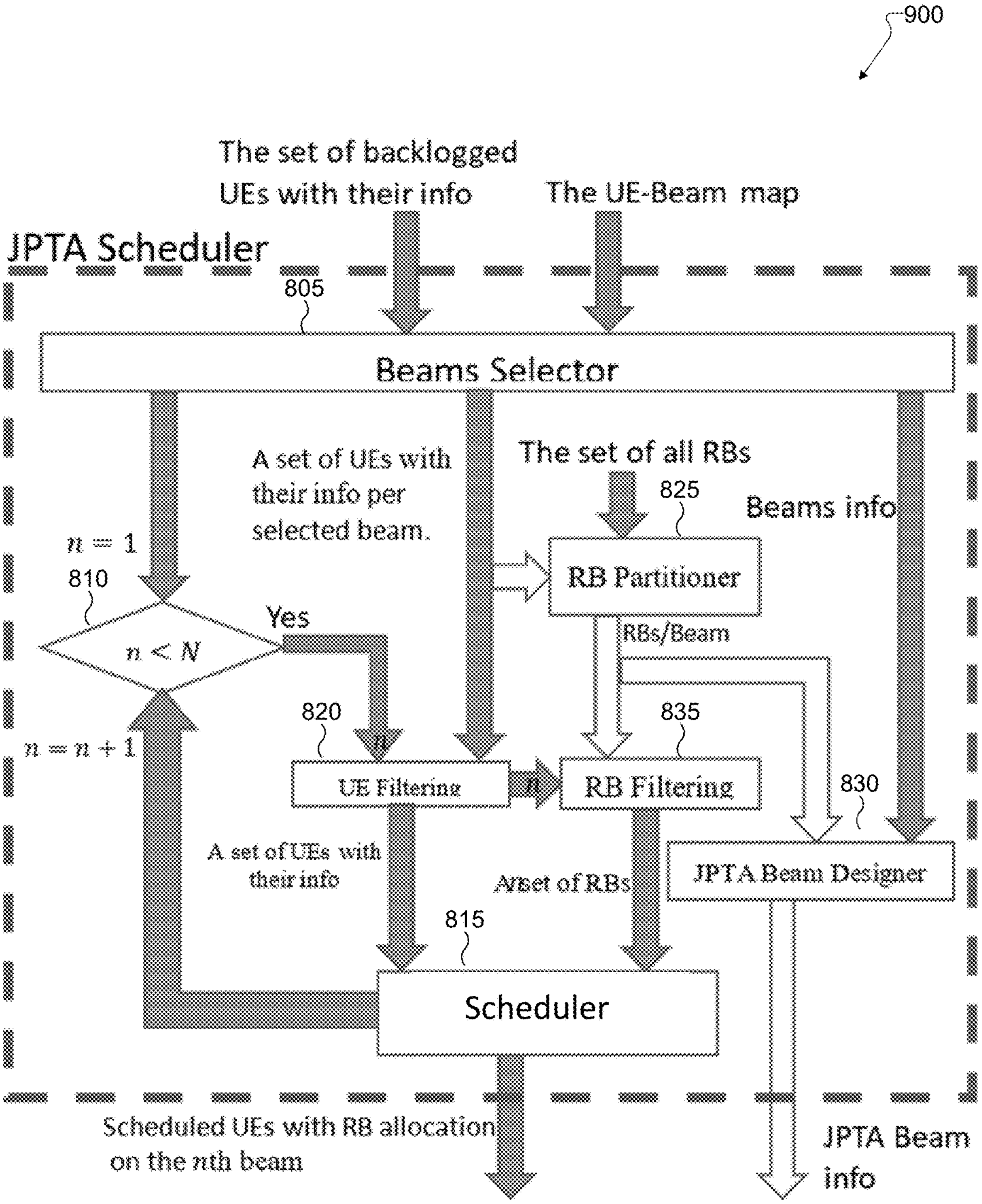
FIG. 9 illustrates a flow diagram of a JPTA scheduler according to embodiments of the present disclosure.

FIG. 9 illustrates a flow diagram 900 of a JPTA scheduler according to embodiments of the present disclosure. For example, flow diagram 900 of a JPTA scheduler can be implemented by the BS 103 of FIG. 1. This example is for illustration only and other embodiments can be used without departing from the scope of the present disclosure.

With reference to FIG. 9, an alternative to the implementation in FIG. 8 is provided. In this implementation, the RB Partitioner block 825 takes the UE info from the beam(s) selector block 805 as an additional input. This way, the RB partitioning could be relative to the load per beam, i.e., more RBs are assigned to beams that are highly loaded. All the other blocks are similar to the implementation in FIG. 8.

Figure 10:
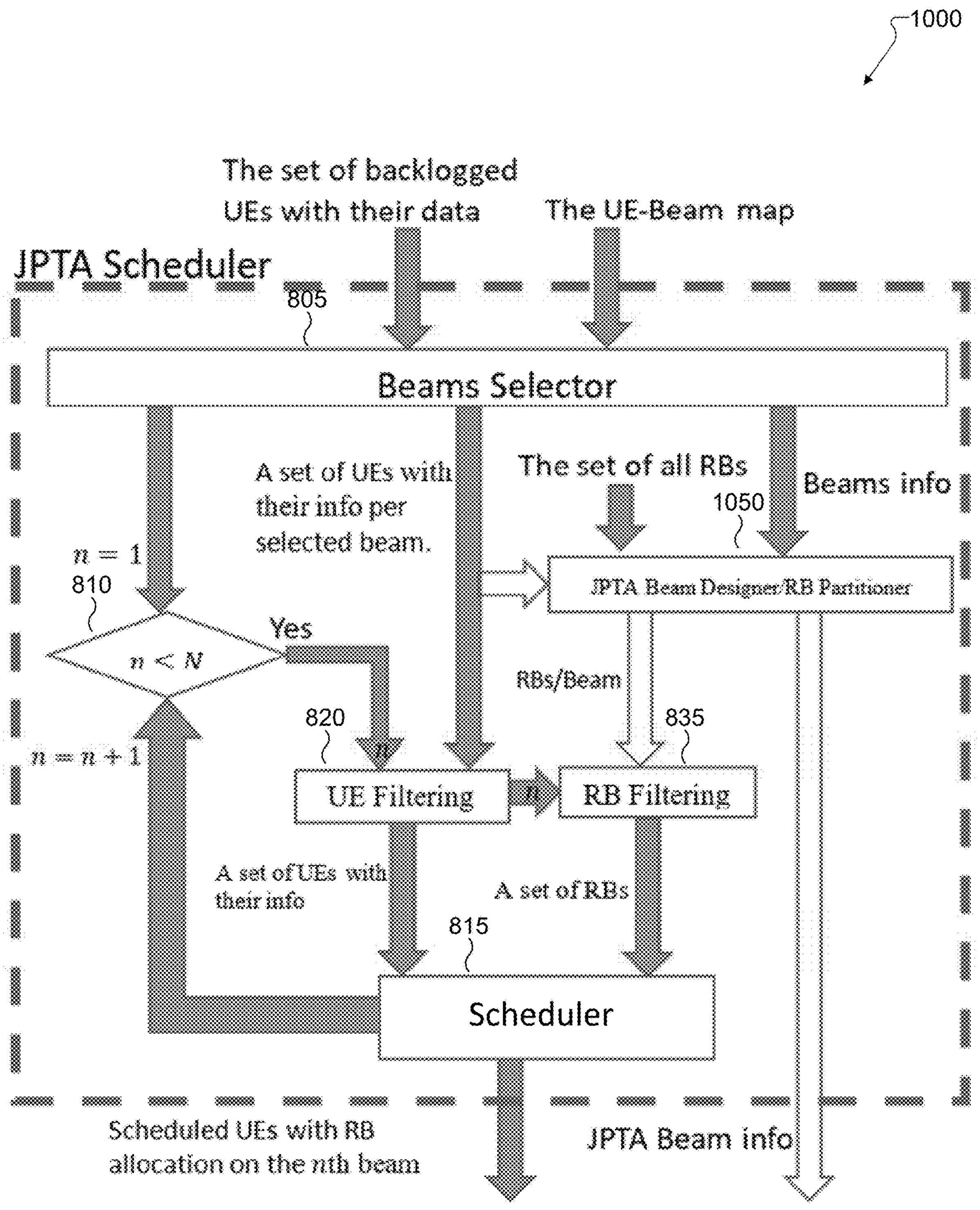
FIG. 10 illustrates a flow diagram of a JPTA scheduler according to embodiments of the present disclosure.

FIG. 10 illustrates a flow diagram 1000 of a JPTA scheduler according to embodiments of the present disclosure. For example, flow diagram 1000 of a JPTA scheduler can be implemented by the BS 102 of FIG. 2. This example is for illustration only and other embodiments can be used without departing from the scope of the present disclosure.

With reference to FIG. 10, an alternative to the implementation shown in FIG. 9, the RB Partitioner block 825 and JPTA Beam Designer block 830 are combined into a new block JPTA Beam Designer/RB Partitioner block 1050. This implementation is important for the case of limited JPTA beams, i.e., it is not feasible to design a JPTA beam with arbitrary sets of RBs per beam. Hence, by the JPTA beam designer/RB partitioner block 1050 and based on the selected beams from the beam(s) selector block 805, a JPTA beam could be designed, then the RB allocation per beam is determined by the RBs with high beam gain in the pointing direction of this beam.

Figure 11:
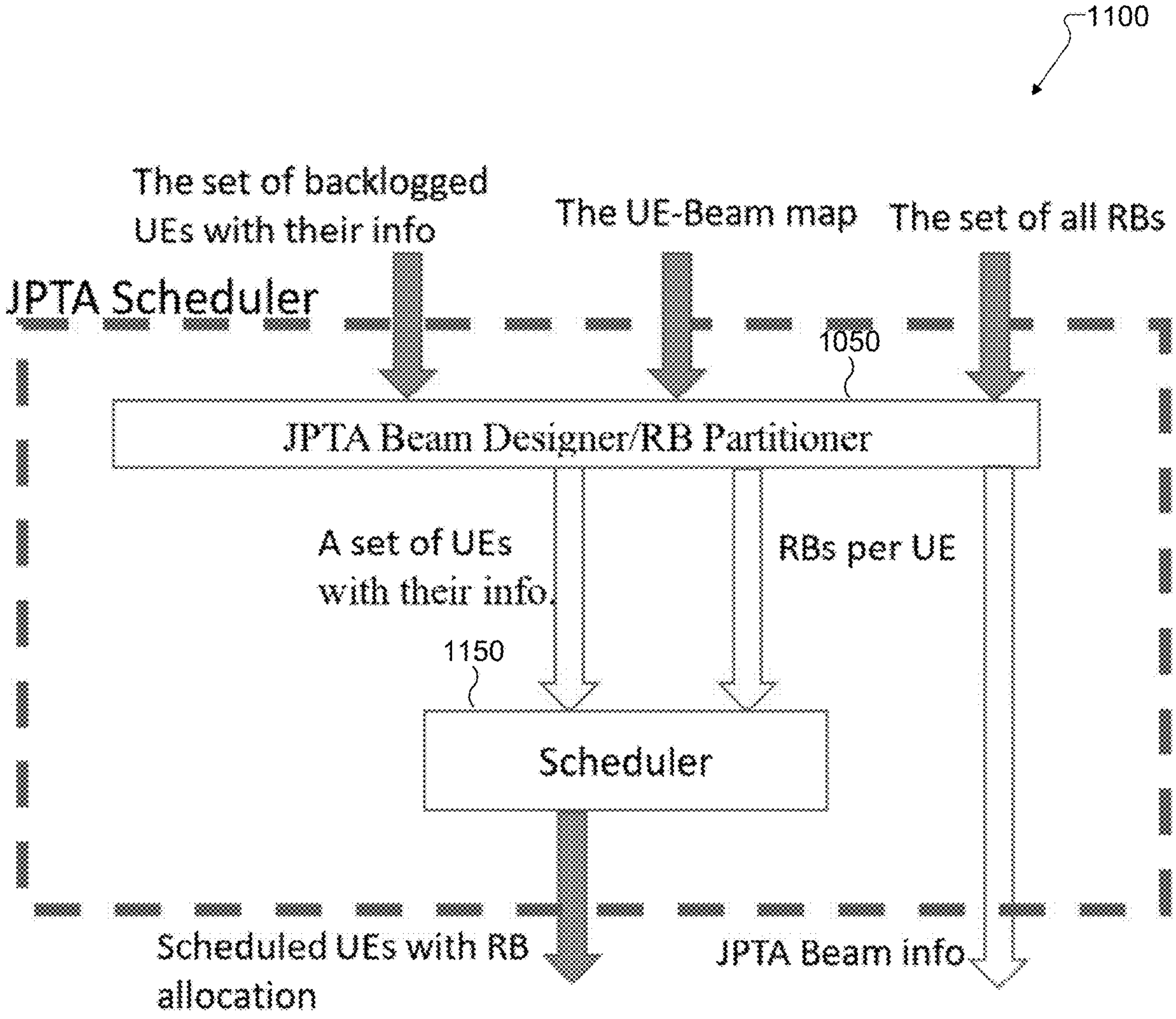
FIG. 11 illustrates a flow diagram of a JPTA scheduler according to embodiments of the present disclosure.

FIG. 11 illustrates a flow diagram 1100 of a JPTA scheduler according to embodiments of the present disclosure. For example, flow diagram 1100 of a JPTA scheduler can be implemented by either BS 102 or BS 103 of FIG. 1. This example is for illustration only and other embodiments can be used without departing from the scope of the present disclosure.

Note that the previous implementations of the JPTA Scheduler 800 reuse the beam(s) selector block 805 and the Scheduler block 815 in one or more examples described herein. But this is not the only possible implementation. With reference to FIG. 11, in this implementation embodiments of the present disclosure provide a new JPTA scheduler which is a custom created scheduler not discussed in previous figures. The JPTA Beam designer/RB partitioner block 1050 designs a JPTA beam taking into account the spatial distribution of the UEs and their info, then for each UE, it finds the set of RBs over which a high beam gain is achieved. These sets of RBs are then fed to the Scheduler 1150, which down-selects the set of UEs that will be scheduled along with their RBs allocation, such that each RB is assigned to a single UE. This approach is different than the ones discussed before, in the sense that the loop is over RBs in this case, i.e., for each RB, select the served UE. This approach could increase the complexity of the design, but can potentially enhances the RB utilization. This approach is also useful for a codebook-based JPTA beam design, where a finite, possibly small, set of preconfigured JPTA beams are available. Hence, a JPTA beam is found first. The UEs are selected based on the specific chosen beam.

Figure 12:
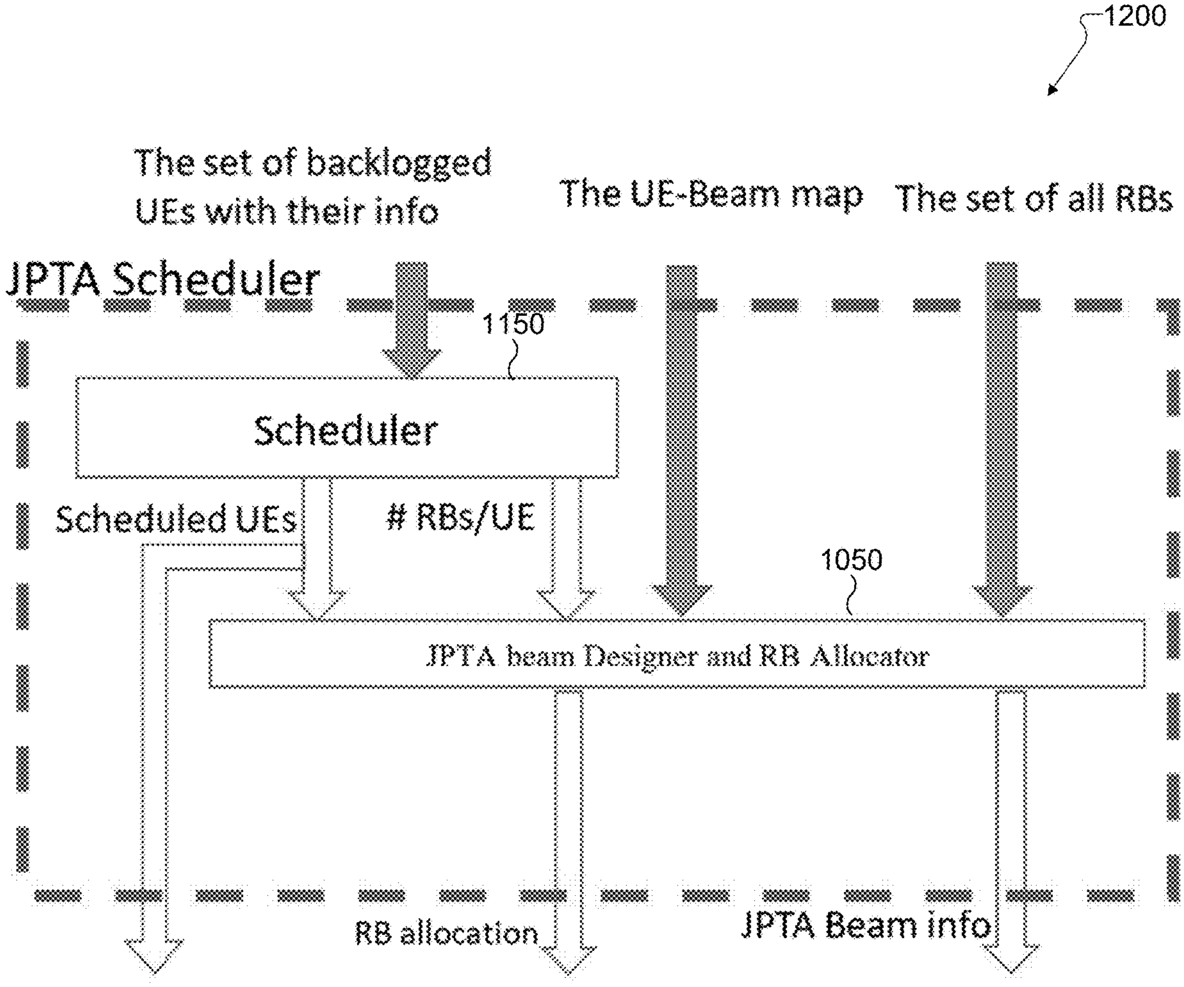
FIG. 12 illustrates a flow diagram of a JPTA scheduler according to embodiments of the present disclosure.

FIG. 12 illustrates a flow diagram 1200 of a JPTA scheduler according to embodiments of the present disclosure. For example, flow diagram 1200 of a JPTA scheduler can be implemented by the BS 103 of FIG. 1. This example is for illustration only and other embodiments can be used without departing from the scope of the present disclosure.

With reference to FIG. 12, in yet another alternative implementation, the UEs are scheduled first, and then a JPTA beam could be designed that is specifically tailored for this set of UEs. In the previous implementations discussed above (FIGS. 8-11), the UE scheduling is done after the beams are selected or after the JPTA beam is designed. FIG. 12 shows the option where the UEs are scheduled first, where the scheduler 1150 output is the set of scheduled UEs and the desired number of RBs per UE. Then a JPTA beam could be designed that is specifically tailored for this set of UEs and their desired number of RBs. The JPTA beam designer and RB allocator block 1050 then feeds the exact RBs per UE to the PHY layer block 720. This implementation provides the maximum flexibility at the expense of potential high complexity. It also requires a highly flexible beam designer that could find a suitable beam for any arbitrary set of UEs and desired number of RBs.

The frequency-dependent hybrid beamforming architectures achieved by using JPTA can significantly improve the capabilities of beamforming in high frequency systems like mm-wave and THz systems. The additional capabilities can be quite useful at a base station in several use cases and can also help make the beam alignment and tracking easier. For example, the architectures can be used to serve multiple users in disconnected regions with full beamforming gain with just one ADC at the base station.

However, in order to see any benefits from using JPTA, the scheduler is updated. Benefits of using JPTA are observable using a system-level simulator. The system parameters are shown in the table below. Note that each user is assigned a bandwidth of $$\frac{BW}{N_{UE}},$$

where BW is the total system bandwidth. Each user gets a high beam gain over its own allocated bandwidth (BW), which allows the BS 102 to multiplex the data for all of these users at the same time with no inter-UE interference and without sacrificing the beam gain for each UE.

A full performance analysis shows the average throughput per UE at various serving distances for the four scenarios discussed. The solid lines represent the benchmark scenario of mmWave beam sweeping by phased antenna array.

When UEs are located very close to the BS 102, they experience sufficiently high signal to noise ratios (SNRs) that enable them to utilize the highest MCS level across the entire bandwidth. Consequently, in the case of PAA, UEs at these short distances employ the highest MCS with the maximum number of RBs. However, due to the antenna sweeping procedure, each UE can only transmit every $N_{UE}$ time slots. Similarly, UEs with high SNRs in the JPTA scheme can also use the maximum MCS level. Although they have a smaller portion of RBs available, specifically $$\frac{1}{N_{UE}}$$

of the total RBs, they are able to transmit on every UL time slot. Consequently, the performance of JPTA and PAA is identical at very short serving distances, where using N times the BW is equivalent to having N UL time slots for extremely high SNRs. Conversely, when the serving distance becomes sufficiently large, e.g., at cell-edge, UEs in both schemes operate at MCS level 0 and utilize 4 RBs. However, each UE in JPTA can transmit on every UL time slot, resulting in JPTA achieving a throughput that is $N_{UE}$ times higher than that of PAA.

In summary, at short distances, JPTA does not yield any throughput enhancement, while the gain increases to $N_{UE}\times$ 100% at the cell edge. In regions with moderate SNRs, JPTA may outperform PAA by a significant margin. For instance, in the case of 16 UEs and at a distance of 1500 m, JPTA may deliver a throughput enhancement of 830% compared to the PAA in some examples.

An alternative perspective to assess the benefits of JPTA can be gained by evaluating throughput coverage, which refers to the maximum distance at which the throughput exceeds a specific threshold. For instance, when evaluating a target throughput of 1 Mbps for a scenario with 8 UEs, only UEs located within a distance of 410 m may achieve the desired throughput when using PAA. However, when JPTA is employed, this coverage distance may increase to 790 m.

TABLE 1

| Parameter | Value |
|---|---|
| Bandwidth (MHz) | 400 |
| Carrier frequency (GHz) | 28 |
| FFT size | 4096 |
| Sub-carrier spacing (kHz) | 120 |
| UE TX power (dBm) | 23 |
| UE beam gain (dB) | 0 |

TABLE 1-continued

| Parameter | Value |
|---|---|
| BS peak beam gain (dB) | 28 |
| # of analog beams in PAA | 16 |
| BS noise figure (dB) | 5 |
| Pathloss exponent | 3 |
| TTD delay step size (ns) | 2.5 |

Figure 13:
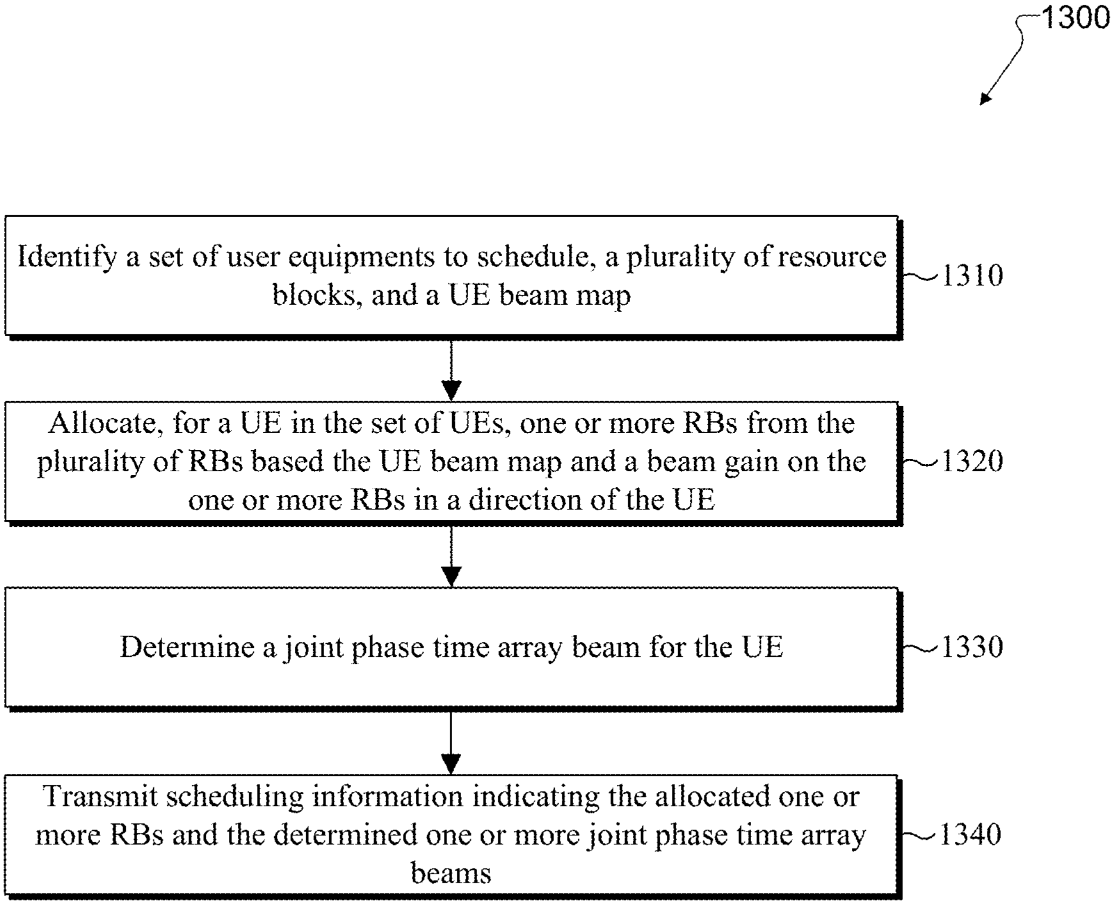
FIG. 13 illustrates an example method performed by a BS in a wireless communication system according to embodiments of the present disclosure.

FIG. 13 illustrates an example method 1300 performed by a BS in a wireless communication system according to embodiments of the present disclosure. The method 1300 of FIG. 13 can be performed by an y of the UEs 111-116 of FIG. 1, such as the UE 116 of FIG. 3. The method 1300 is for illustration only and other embodiments can be used without departing from the scope of the present disclosure.

The method begins in 1310 with the BS identifying a set of UEs to schedule, a plurality of resource blocks, and a UE beam map. For example, the UE beam map may map one or more beams from a plurality of beams to one or more UEs in the set of UEs. In various embodiments, the BS may identify load information about an amount of data to be transmitted or received by the UE. In various embodiments, the number of RBs per UE to schedule for the set of UEs may occur and then a set of JPTA beams for the set of UEs, respectively, based on the number of RBs per UE may be determined.

In 1320, the BS then allocates, for a UE in the set of UEs, one or more RBs from the plurality of RBs based the UE beam map and a beam gain on the one or more RBs in a direction of the UE. In various embodiments, allocating the one or more RBs may include determining a set of RBs associated with the selected set of beams and allocating the one or more RBs from the determined set of RBs. In various embodiments, the UE beam map may include a pointing angle for one or more beams from the plurality of beams. In various embodiments, allocating the one or more RBs for the UE may be based on the load information. In various embodiments, allocating the one or more RBs may include allocating, for the determined JPTA beam, RBs from the plurality of RBs based on a beam gain of the RBs in a direction associated with the JPTA beam. In various embodiments, allocating the one or more RBs may include identifying a set of RBs based on a beam gain for the JPTA beam and allocating the one or more RBs from the set of RBs to the UE. In various embodiments, the BS may select a set of beams for the UE from the plurality of beams based on the UE beam map and the direction of the UE.

In 1330, the BS then determines a JPTA beam for the UE. In various embodiments, the JPTA beam may include determining JPTA beam information for the selected set of beams, the JPTA beam information including (i) phase and time delay information or (ii) a JPTA beam index. In various embodiments, determining the JPTA beam may be based on the pointing angle. In various embodiments, determining the JPTA beam for the UE may be based on the direction of the UE.

In 1340, the BS then transmits scheduling information indicating the allocated one or more RBs and the determined one or more JPTA beams.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A base station (BS) comprising:

a processor configured to:

identify a plurality of user equipments (UEs) to schedule, a plurality of resource blocks (RBs), and a UE beam map, wherein the UE beam map maps one or more beams from a plurality of beams to one or more UEs in the set-plurality of UEs;

determine, for each UE in the plurality of UEs, (i) a beam direction based the UE beam map and (ii) a set of RBs from the plurality of RBs based on a beam gain on the set of RBs in the beam direction of the each UE, wherein the sets of RBs determined for the UEs, respectively, are over different frequencies; and determine a joint phase time array (JPTA) beam for each of the plurality of UEs; and a transceiver operably coupled to the processor, the transceiver configured to transmit scheduling information indicating the determined sets of RBs and the determined JPTA beams.

2. The BS of claim 1, wherein the processor is further configured to determine JPTA beam information for the determined JPTA beams, the JPTA beam information including (i) phase and time delay information or (ii) a JPTA beam index.

3. The BS of claim 1, wherein:

the UE beam map further comprises a pointing angle for one or more beams from the plurality of beams; and the processor is further configured to determine the beam direction based on the pointing angle.

4. The BS of claim 1, wherein the processor is further configured to:

identify load information about an amount of data to be transmitted or received by each of the plurality of UEs; and determine the sets of RBs for each of the plurality of UEs based on the load information.

5. The BS of claim 1, wherein the processor is further configured to allocate, for the determined JPTA beam, RBs from the plurality of RBs based on a beam gain of the RBs in a direction associated with the JPTA beam.

6. The BS of claim 1, wherein the processor is further configured to:

determine a number of RBs per UE to schedule for each of the plurality of UEs; and determine a set of JPTA beams for each of the plurality of UEs, respectively, based on the number of RBs per UE.

7. A method comprising:

identifying a plurality of user equipments (UEs) to schedule, a plurality of resource blocks (RBs), and a UE beam map, wherein the UE beam map maps one or more beams from a plurality of beams to one or more UEs in the plurality of UEs;

determining, for each UE in the plurality of UEs, (i) a beam direction based the UE beam map and (ii) a set of RBs from the plurality of RBs based on a beam gain on the set of RBs in the beam direction of the each UE, wherein the sets of RBs determined for the UEs, respectively, are over different frequencies;

determining a joint phase time array (JPTA) beam for each of the plurality of UEs; and transmitting scheduling information indicating the determined sets of RBs and the determined JPTA beams.

8. The method of claim 7, wherein determining the JPTA beam further comprises determining JPTA beam information for the determined JPTA beams, the JPTA beam information including (i) phase and time delay information or (ii) a JPTA beam index.

9. The method of claim 7, wherein:

the UE beam map further comprises a pointing angle for one or more beams from the plurality of beams, and determining the JPTA beam further comprises determining the beam direction based on the pointing angle.

10. The method of claim 7, further comprising:

identifying load information about an amount of data to be transmitted or received by each of the plurality of UEs, wherein determining the sets of RBs further comprises determining the sets of RBs for each of the plurality of UEs based on the load information.

11. The method of claim 7, wherein allocating the set of RBs further comprises allocating, for the determined JPTA beam, RBs from the plurality of RBs based on a beam gain of the RBs in a direction associated with the JPTA beam.

12. The method of claim 7, further comprising:

determining a number of RBs per UE to schedule for each of the plurality of UEs; and determining a set of JPTA beams for each of the plurality of UEs, respectively, based on the number of RBs per UE.

13. A non-transitory computer readable medium comprising program code that, when executed by a processor of a base station (BS), causes the BS to:

identify a plurality of user equipments (UEs) to schedule, a plurality of resource blocks (RBs), and a UE beam map, wherein the UE beam map maps one or more beams from a plurality of beams to one or more UEs in the plurality of UEs;

determine, for each UE in the plurality of UEs, (i) a beam direction based the UE beam map and (ii) a set of RBs from the plurality of RBs based on a beam gain on the set of RBs in the beam direction of the each UE, wherein the sets of RBs determined for the UEs, respectively, are over different frequencies;

determine a joint phase time array (JPTA) beam for each of the plurality of UEs; and transmit scheduling information indicating the determined sets of RBs and the determined JPTA beams.

14. The non-transitory computer readable medium of claim 13, wherein the program code to determine the JPTA beam further comprises program code that, when executed by the processor, causes the BS to determine JPTA beam information for the determined JPTA beams, the JPTA beam information including (i) phase and time delay information or (ii) a JPTA beam index.

15. The non-transitory computer readable medium of claim 13, wherein:

the UE beam map further comprises a pointing angle for one or more beams from the plurality of beams, and the program code to determine the JPTA beam further comprises program code that, when executed by the processor, causes the BS to determine the beam direction based on a pointing angle.

16. The non-transitory computer readable medium of claim 13, wherein the program code further comprises program code that, when executed by the processor, causes the BS to:

identify load information about an amount of data to be transmitted or received by each of the plurality of UEs; and determine the sets of RBs for each of the plurality of UEs based on the load information.

17. The non-transitory computer readable medium of claim 13, wherein the program code further comprises program code that, when executed by the processor, causes the BS to:

allocate, for the determined JPTA beam, RBs from the plurality of RBs based on a beam gain of the RBs in a direction associated with the JPTA beam.

18. The non-transitory computer readable medium of claim 13, wherein the program code further comprises program code that, when executed by the processor, causes the BS to:

determine a number of RBs per UE to schedule for each of the plurality of UEs; and determine a set of JPTA beams for each of the plurality of UEs, respectively, based on the number of RBs per UE.

* * * * *